United States Patent [19]

Fenton

[11] 4,016,239
[45] Apr. 5, 1977

[54] RECARBONATION OF SPENT OIL SHALE

[75] Inventor: Donald M. Fenton, Anaheim, Calif.

[73] Assignee: Union Oil Company of California, Los Angeles, Calif.

[22] Filed: May 22, 1975

[21] Appl. No.: 579,778

[52] U.S. Cl. .............................. 423/155; 208/11 R
[51] Int. Cl.² ........................................ C01F 11/18
[58] Field of Search ............ 208/11; 423/165, 430, 423/155

[56] References Cited

UNITED STATES PATENTS

| | | | |
|---|---|---|---|
| 2,637,545 | 5/1953 | Hicguet | 423/430 |
| 3,510,255 | 5/1970 | Hall et al. | 208/11 |

Primary Examiner—Delbert E. Gantz
Assistant Examiner—James W. Hellwege
Attorney, Agent, or Firm—Lannas S. Henderson; Richard C. Hartman; Dean Sandford

[57] ABSTRACT

Spent oil shale from retorting operations, containing water-soluble alkaline oxides such as calcium oxide is subjected to a recarbonation process in order to reduce its alkalinity and thereby prevent ecological damage to plant and aquatic animal life which could result from alkaline leachings derived rom rain or snowfall on open dumps of such spent shale. For economic reasons, a rapid recarbonation is necessary, and such is achieved herein by wetting the spent shale with water containing dissolved carbonate and/or bicarbonate salts, and contacting the so wetted spent shale with an atmosphere comprising a substantial partial pressure of carbon dioxide for a period of time ranging between about 10 minutes and two hours.

10 Claims, No Drawings

RECARBONATION OF SPENT OIL SHALE

BACKGROUND AND SUMMARY OF THE INVENTION

In the retorting of oil shale for the production of shale oil, nearly all processes developed to date involve passing crushed shale through a gas heated eduction zone maintained at temperatures between about 800° and 1000° F to effect pyrolitic eduction of oil therefrom, leaving educted shale particles still containing about 3–10 weight-percent of coke. Commonly, this remaining coke is burned to generate, either directly or indirectly, the hot gases needed for the eduction zone. Temperatures in the burning zone may range from about 1200° to 2000° F. In other instances, as illustrated in U.S. Pat. No. 3,577,338, the carbon of the educted shale particles is subjected to gasification with superheated steam to generate hydrogen-rich fuel gases. Gasification temperatures are usually in the same range as those encountered in coke combustion zones. In either case, when the educted shale reaches temperatures in excess of about 1200° F, the partial pressure of $CO_2$ in the gases flowing through the gasification or combustion zone is normally insufficient to suppress completely the decomposition of mineral carbonates to oxides, as e.g.:

$$CaCO_3 \rightleftarrows CaO + CO_2 \qquad (1)$$

The end result is that the spent decarbonized shale contains substantial quantities of relatively water-soluble alkaline metal oxides such as calcium oxide.

With the advent of possible large scale commercial development of oil shale retorting, an ecologically significant problem arises as to safe methods for disposing of the huge volumes of this alkaline spent shale. The only presently conceived methods deemed to be feasible involve either dumping the material in open dumps and eventually revegetating the surface thereof, or returning it to exhausted caverns from which the fresh shale was mined. It either event there is a conceivable danger that for some months after disposal of the spent shale, damage to vegetation and/or aquatic animal life could occur. Aqueous leachings from such spent shale commonly display a pH of around 11–12, and such alkalinity can persist in many volumes of leachate per volume of spent shale. Most plant life, as well as aquatic animal life, are damaged by waters having a pH above about 8.5. Consequently, it is conceivable that for some months after disposal of spent shale, leachings from rain or melting snow could produce ecologically damaging downstream runoff.

The foregoing may appear surprising in view of the common knowledge that calcium oxide in the form for example of quick lime is fairly rapidly converted to calcium carbonate by atmospheric $CO_2$. However, it appears that the calcium oxide and/or other water-soluble alkaline oxides present in spent shale are in crystalline form which is kinetically very resistant to this recarbonation reaction. Consequently, alkaline runoffs may occur for some time before atmospheric $CO_2$ can bring about a sufficient recarbonation of the spent shale to avoid this hazard and to form a vegetatable soil.

In view of the foregoing, it is considered a prudent precaution to devise some economical means for reducing the alkalinity of the spent shale by recarbonation before ultimate disposal thereof. On its face, this would seem to be a simple matter in view of the well-known thermodynamics of equation (1) above. As is well known, this reaction will proceed to completion to the left at any temperature below 900° C in the presence of one atmosphere of $CO_2$. The equilibrium dissociation pressure of $CO_2$ in contact with the calcium carbonate at 700° C is only 25 mm. It would hence appear to be a simple matter to merely contact the spent shale with waste $CO_2$ from the retorting operation to effect recarbonation. Quite unexpectedly, this has not been found to be the case; as noted above, the calcium oxide and other water-soluble alkaline oxides are apparently in a crystal form which is remarkably resistant to such recarbonation. Repeated attempts to recarbonate samples of spent shale at economically low partial pressures of $CO_2$, and within reasonable time periods, have failed.

Undoubtedly recarbonation could be effected with holding times of several days or more in contact with at least one atmosphere of $CO_2$, but in view of the huge volumes of spent shale to be handled, the investment in tankage would be prohibitive, particularly at superatmospheric pressures. The prime objective of this invention is to effect adequate recarbonation in a period of time ranging between about 10 minutes and two hours at atmospheric pressure. In many instances this would permit recarbonation during conveyance of the spent shale from the retorting zone to the storage area in a shrouded conveyor through which a stream of $CO_2$ is passed. In other instances, small holding tanks or towers could be utilized through which $CO_2$ is passed in contact with a fixed or moving bed of the spent shale.

The present invention is based upon my discovery that the foregoing objectives can be achieved by wetting the spent shale with water containing a small proportion of a dissolved carbonate or bicarbonate salt, and contacting the same with $CO_2$ at moderate partial pressures of between about 0.5 and 15 psi for times within the aforementioned range. A surprising aspect of the invention is that distilled water, or other waters free of carbonate and bicarbonate salts, are substantially ineffective. This is surprising because, inasmuch as the spent shale still contains substantial quantities of calcium carbonate, $CO_2$ dissolved in distilled water would be expected to react with the calcium carbonate to yield the relatively soluble salt, calcium bicarbonate. It would appear that both the calcium oxide (which should form calcium hydroxide with water) and the calcium carbonate present in spent shale are quite resistant to reaction with dissolved carbon dioxide, unless the water contains in solution a small proportion of a carbonate and/or bicarbonate salt.

It should be noted that a saturated solution of calcium carbonate in pure water at 25° C has a pH of about 9.4, which is above the safe alkalinity level for most plant and aquatic animal life. However, calcium carbonate is soluble only to the extent of about 0.0015 gms per 100 ml of water at 25° C, whereas calcium oxide is about sixty-six times more soluble. By virtue of the very low solubility of calcium carbonate, only very minor proportions of dissolved $CO_2$ or bicarbonate salts are sufficient to buffer the pH thereof down to safe levels below about 8.5, generally below 8. Sufficient $CO_2$ is generally present in rainwaters to produce an adequate buffering proportion of the much more soluble salt, calcium bicarbonate. Even if such were not the case however, high pH leachings of calcium carbonate would very rapidly pick up sufficient atmospheric $CO_2$ to reduce the pH to safe levels, or would rapidly reach ground waters containing dissolved $CO_2$ and bicarbonate salts. The high solubility of calcium hydroxide however, as well as its higher alkalinity, render these neutralizing and/or buffering mechanisms much slower in taking effect. Hence the desirability for converting the more soluble, more alkaline oxides to the less soluble, less alkaline carbonates.

DETAILED DESCRIPTION

The spent shales amenable to recarbonation herein may vary widely in origin and composition, but in general may be characterized as the residue remaining after an oil shale has been subjected to temperatures in excess of about 1000° F, and normally above 1200° F, during thermal pyrolysis for oil eduction, or in subsequent coke combustion and/or gasification operations. Major components usually found in such spent shales are as follows:

| Major Spent Shale Components, Wt. % | | |
| --- | --- | --- |
| | Broad Range | Usual Range |
| $CaCO_3$ | 5–35 | 10–30 |
| CaO | 5–35 | 10–30 |
| Quartz | 10–40 | 15–30 |
| Feldspar | 0–30 | 5–25 |
| Na | 0.5–5 | 1–3 |
| Mg | 0.5–5 | 1–4 |
| Fe | 0.1–2 | 0.5–1 |
| C (elemental) | 0–5 | 1–3 |

Spent shales of the above nature are normally recovered from the retorting unit in the form of granules ranging in size from about ⅛-inch to 2 inches in average diameter. As those skilled in the art will readily understand, the size of the spent shale granules has some significant bearing upon the severity of treatment required to effect adequate recarbonation. For particle sizes in the range of about ¼-inch - ½-inch, in contact with one atmosphere of carbon dioxide, recarbonation can usually be effected at ambient temperatures in time periods ranging from about 10 minutes to one hour. Larger particle sizes will of course require more extended treatment. Contacting temperatures may vary between about 0° and 100° C, preferably between about 25° and 95° C. The more elevated temperatures appear to accelerate the recarbonation.

For practical purposes, the recarbonation can be deemed satisfactorily complete when aqueous leaching of the treated shale produces no more than about 10 volumes per volume of shale of leachate having a pH above 9.0. Preferably however, the treatment is continued for a sufficient time to reduce such alkaline leachate to no more than about 5 volumes per volume of shale.

As it emerges from the retorting facility, final cooling of the spent shale is often carried out by means of a water quench. It is at this point that the shale can most conveniently be wetted with water containing dissolved carbonate and/or bicarbonate salts for subsequent contacting with $CO_2$. A critical aspect of the recarbonation involves the proportion of water on the spent shale while in contact with $CO_2$. It has been found that water in amounts less than about 10 weight-percent is relatively ineffective. It is therefore preferred to use amounts ranging from about 20 weight-percent up to completely submerging quantities. One suitable contacting technique involves bubbling $CO_2$ upwardly through a column of submerged spent shale, thereby providing agitation as well as intimate contacting. As suggested above however, the most economical contacting procedure would involve merely flowing a stream of $CO_2$ through a hooded conveyor counter-currently to the wetted shale enroute to a dump site.

As indicated above, wetting the spent shale with salt-free water is relatively ineffective for accelerating the recarbonation. For reasons which are not understood, the presence of a dissolved carbonate or bicarbonate salt is required for maximum efficiency of recarbonation. Further, it appears that the salt solution should be alkaline, in the pH range of about 7.2 – 9.0. In one experiment, tap water was saturated to a pH of 6.0 with $CO_2$ and was found not to be effective in promoting recarbonation. Ordinary tap water however containing 222 mg/l of bicarbonate ions and having a pH of about 8.0 was found to be effective. In general, salt concentrations providing from about 50–2000 mg/l of carbonate or bicarbonate ions may be utilized, but best results are usually obtained when the solution contains at least about 200 mg/l of carbonate or bicarbonate ions. Suitable salts which may be utilized include the alkali metal carbonates and bicarbonates and the bicarbonates of calcium and magnesium. Ammonium carbonate or bicarbonate may also be utilized. Preferred salt comprise sodium carbonate, sodium bicarbonate, calcium bicarbonate, and ammonium carbonate.

There is of course no upper limit on operative $CO_2$ partial pressures, but economic considerations generally dictate partial pressures in the range of about 0.1 and 50 psi, preferably about 0.5 – 15 psi.

PREFACE TO EXAMPLES

In the following examples, which are not to be construed as limiting in scope, the spent shale in all cases was derived from the retorting-gasification of a Colorado oil shale at retorting temperatures in the 850° – 1000° F range and steam-gasification temperatures in the 1200° – 1400° F range. The spent shale was a friable grey solid predominantly in the particle size range of ¼ inch – ¾ inch diameter with no particles larger than 1 inch diameter. Its principal chemical components were as follows:

| | Wt.% |
| --- | --- |
| $CaCO_3$ | 21 |
| CaO | ~12 |
| Feldspar | 14 |
| Quartz | 24 |
| Na | 2 |
| pH of moist surface | 12.0 |

In all examples, the degree of recarbonation achieved is indicated by pH measurements of successive aqueous leachates. Any pH above about 8.6 is a clear indication that CaO is still being leached out.

EXAMPLE 1

A 100 gm sample of the fresh, hydrated spent shale was subjected to 10 consecutive leachings at 70° F with 300 ml of distilled water. Another 100 gm sample was subjected to the same treatment after being allowed to stand for 24 hours at room temperature in one atmosphere of $CO_2$. The pH and total dissolved solids (TDS) of the various leachates were as follows:

TABLE 1

| Leachate No. | Untreated Shale | | $CO_2$-treated Shale | |
|---|---|---|---|---|
| | pH | TDS,ppm | pH | TDS,ppm |
| 1 | 11.7 | 968 | 11.1 | 1238 |
| 2 | 11.4 | | 11.7 | |
| 3 | 11.1 | | 11.6 | |
| 4 | 11.3 | | 11.4 | |
| 5 | 11.1 | 324 | 11.2 | 318 |
| 6 | 11.3 | | 11.0 | |
| 7 | 10.9 | | 10.8 | |
| 8 | 11.3 | | 10.8 | |
| 9 | 11.0 | | 10.8 | |
| 10 | 10.9 | 340 | 10.8 | 300 |

It will be apparent that the 24-hour treatment with $CO_2$ had no significant effect. After leaching with 30 volumes of water per 100 gms of spent shale, the leachates were still highly alkaline.

EXAMPLE 2

Three additional 100 gm samples of the spent shale were contacted with 300 psi of $CO_2$ for 2 hours at various temperatures indicated below. Ten consecutive leachings at 70° F with 300 ml of distilled water gave leachates of the following properties:

TABLE 2

| Leachate No. | Temp. of $CO_2$ Treatment, ° C | | | | | |
|---|---|---|---|---|---|---|
| | 100 | | 200 | | 300 | |
| | pH | TDS | pH | TDS | pH | TDS |
| 1 | 11.2 | 982 | 11.3 | 864 | 11.2 | 1108 |
| 2 | 11.2 | | 11.0 | | 11.1 | |
| 3 | 11.2 | | 11.2 | | 11.1 | |
| 4 | 11.2 | | 10.9 | | 11.0 | |
| 5 | 11.3 | 290 | 10.6 | 250 | 11.0 | 280 |
| 6 | 11.3 | | 10.4 | | 10.9 | |
| 7 | 11.1 | | 11.0 | | 11.0 | |
| 8 | 11.2 | | 11.1 | | 11.0 | |
| 9 | 11.4 | | 11.2 | | 10.9 | |
| 10 | 11.3 | 230 | 11.0 | 246 | 11.0 | 262 |

It is evident that even at elevated temperatures and $CO_2$ pressures recarbonation is very slow in the absence of water.

EXAMPLE 3

Three additional 100 gm samples of the spent shale were wetted with 5 weight-percent of distilled water, then carbonated and leached as described in Example 2, with the following results:

TABLE 3

| Leachate No. | Temp. of $CO_2$ Treatment, ° C | | | | | |
|---|---|---|---|---|---|---|
| | 100 | | 200 | | 300 | |
| | pH | TDS | pH | TDS | pH | TDS |
| 1 | 9.8 | 646 | 9.3 | 726 | 10.2 | 670 |
| 2 | 10.1 | | 10.2 | | 10.6 | |
| 3 | 9.4 | | 9.7 | | 10.6 | |
| 4 | 9.8 | | 10.0 | | 10.6 | |
| 5 | 10.1 | 162 | 9.8 | 246 | 10.6 | 206 |
| 6 | 9.9 | | 9.4 | | 10.6 | |
| 7 | 8.6 | | 9.2 | | 10.6 | |
| 8 | 8.4 | | 10.0 | | 10.6 | |
| 9 | 9.8 | | 9.3 | | 10.6 | |
| 10 | 10.2 | 98 | 10.3 | 104 | 10.6 | 136 |

EXAMPLE 4

Three additional 100 gm samples of the spent shale were wetted with 30 weight-percent of distilled water, then carbonated and leached as described in Example 2, with the following results:

TABLE 4

| Leachate No. | Temp. of $CO_2$ Treatment, ° C | | | | | |
|---|---|---|---|---|---|---|
| | 100 | | 200 | | 300 | |
| | pH | TDS | pH | TDS | pH | TDS |
| 1 | 8.4 | 2512 | 8.3 | 1824 | 8.2 | 670 |
| 2 | 8.7 | | 8.5 | | 8.6 | |
| 3 | 8.6 | | 8.3 | | 8.7 | |
| 4 | 8.7 | | 8.5 | | 8.7 | |
| 5 | 8.9 | 138 | 9.0 | 334 | 9.0 | 206 |
| 6 | 9.0 | | 9.2 | | 9.2 | |
| 7 | 9.1 | | 9.0 | | 9.4 | |
| 8 | 9.0 | | 9.2 | | 9.3 | |
| 9 | 9.0 | | 9.1 | | 9.3 | |
| 10 | 9.2 | 150 | 9.2 | 166 | 9.3 | 136 |

Comparing Tables 3 and 4, it will be seen that 30 weight-percent of distilled water during carbonation is more effective than 5 weight-percent, but no consistently acceptable pH levels were reached in either case, even at the economically impractical carbonation pressure of 300 psi.

EXAMPLE 5

Five additional 100 gm samples of the spent shale were wetted with varying proportions of a tap water having a pH of about 8.0 and containing 222 mg/l of bicarbonate ions. Carbon dioxide was then bubbled through the wetted beds at atmospheric pressure for 30 minutes, and at various temperatures. The carbonated samples were than leached 10 times in succession with 300 ml portions of the tap water at room temperature, with the following results:

TABLE 5

| Run No.: | 1 | 2 | 3 | 4 | 5 |
|---|---|---|---|---|---|
| Carbonation Water, g | 5 | 5 | 10 | 30 | 30 |
| Carbonation Temp., ° C | 22 | 93 | 22 | 22 | 93 |
| pH of Leachates | | | | | |
| 1 | 8.5 | 10.3 | 8.1 | 8.1 | 8.2 |
| 2 | 8.7 | 10.3 | 8.4 | 8.1 | 8.4 |
| 3 | 9.3 | 10.2 | 8.6 | 8.6 | 7.9 |
| 4 | 8.6 | 10.0 | 8.6 | 9.4 | 8.6 |
| 5 | 9.1 | 10.0 | 8.8 | 9.2 | 8.4 |
| 6 | 9.2 | 9.8 | 8.6 | 8.6 | 7.8 |
| 7 | 8.7 | 9.6 | 8.3 | 8.4 | 7.3 |
| 8 | 9.1 | 9.5 | 8.7 | 8.5 | 7.8 |
| 9 | 8.7 | 9.6 | 8.3 | 8.6 | 8.3 |
| 10 | 8.5 | — | 8.4 | — | — |

Runs 3, 4 and 5 above demonstrate that the use of relatively large proportions of tap water gives satisfactory results, even with only 30 minutes carbonation time at atmospheric pressure. Runs 1 and 2 show that if insufficient tap water is used the results are unsatisfactory, especially at high carbonation temperatures.

EXAMPLE 6

The procedure of Example 5 was repeated with two additional 100 gm samples of the spent shale, with the exception that in each case 0.1 gm of $(NH_4)_2CO_3$ was added to the carbonation water. The results were as follows:

TABLE 6

| Run No.: | 5 | 7 |
|---|---|---|
| Carbonation Water, gm | 5 | 30 |
| Carbonation Temp., ° C | 93 | 93 |
| pH of Leachates | | |
| 1 | 9.4 | 9.1 |
| 2 | 9.3 | 8.9 |
| 3 | 9.2 | 8.4 |
| 4 | 8.9 | 7.6 |
| 5 | 8.9 | 7.7 |

TABLE 6-continued

| | | |
|---|---|---|
| 6 | 8.8 | 7.8 |
| 7 | 8.5 | 7.8 |
| 8 | 8.3 | 7.8 |
| 9 | 8.1 | 7.6 |
| 10 | 8.6 | 7.6 |

Run No. 7 clearly demonstrates the very satisfactory results obtained by the use of large proportions of carbonation water containing an added carbonate salt.

The following claims and their obvious equivalents are believed to define the true scope of the invention.

I claim:

1. A method for decreasing the alkalinity of spent granular oil shale which, during or following a thermal eduction, has been subjected to decarbonating temperatures in excess of about 1000° F, which comprises wetting said spent shale with at least about 10 weight-percent of an aqueous solution containing sufficient of a dissolved salt selected from the class consisting of carbonates and bicarbonates to provide at least about 50 mg/l of carbonate and/or bicarbonate ions, and thereafter contacting the wetted shale with a carbonating gas comprising at least about 0.1 psi of $CO_2$ for a sufficient time to reduce the volume of aqueous leachings obtainable therefrom, and having a pH above 9.0, to below about 10 volumes per volume of said spent shale.

2. A method as defined in claim 1 wherein said decarbonating temperatures are encountered in a combustion zone wherein a peak temperature in excess of 1200° F prevails.

3. A method as defined in claim 1 wherein said decarbonating temperatures are encountered in a steam gasification zone wherein a peak temperature in excess of 1200° F prevails.

4. A method as defined in claim 1 wherein sufficient of said salt is utilized to provide about 200 – 2000 mg/l of carbonate and/or bicarbonate ions in said aqueous solution.

5. A method as defined in claim 4 wherein said salt is selected from the class consisting of alkali metal carbonates and bicarbonates, calcium bicarbonate, magnesium bicarbonate, ammonium carbonate and ammonium bicarbonate.

6. A method as defined in claim 1 wherein said carbonating gas comprises about 0.1 – 50 psi of $CO_2$.

7. A method as defined in claim 6 wherein said contacting is carried out at between about 25° and 95° C.

8. A method as defined in claim 7 wherein said contacting is carried out for about 10 minutes to two hours.

9. A method as defined in claim 1 wherein said contacting is continued for a sufficient time to reduce the volume of aqueous leachings obtainable from said spent shale, and having a pH above 9.0, to below about 5 volumes per volume of shale.

10. A method as defined in claim 1 wherein (a) said spent shale is wetted with at least about 20 weight-percent of said aqueous solution, (b) sufficient of said salt is utilized to provide about 200 – 2000 mg/l of carbonate and/or bicarbonate ions in said solution and (c) said carbonating gas comprises about 0.5 – 15 psi of $CO_2$.

* * * * *